INVENTOR
GLENN H. CURTISS by
ATTORNEY.

G. H. CURTISS.
FLYING BOAT.
APPLICATION FILED DEC. 6, 1915.

1,246,016.

Patented Nov. 6, 1917
6 SHEETS—SHEET 5

INVENTOR
GLENN H. CURTISS.
by John P. Farbox
ATTORNEY

G. H. CURTISS.
FLYING BOAT.
APPLICATION FILED DEC. 6, 1915.

1,246,016.

Patented Nov. 6, 1917.
6 SHEETS—SHEET 6.

INVENTOR
GLENN H. CURTISS.

by
ATTORNEY.

UNITED STATES PATENT OFFICE.

GLENN H. CURTISS, OF BUFFALO, NEW YORK, ASSIGNOR TO CURTISS AEROPLANE AND MOTOR CORPORATION, A CORPORATION OF NEW YORK.

FLYING-BOAT.

1,246,016.  Specification of Letters Patent.   Patented Nov. 6, 1917.

Application filed December 6, 1915. Serial No. 65,373.

*To all whom it may concern:*

Be it known I, GLENN H. CURTISS, a citizen of the United States, residing at Buffalo, in the county of Erie and State of New York, have invented certain new and useful Improvements in Flying-Boats, of which the following is a specification.

My present invention relates to that type of air-craft known as the flying boat, owing to its coördinate capabilities upon the water as a hydroplane and in aerial flight, differing from the hydroaeroplane proper in the use of an actual boat structure for the pontoon-equipped fuselage of the latter. This boat structure serves to characterize the flying boat by its hydroplane-built hull carrying amidships the aerial supporting surfaces and aft on its tail portion the control and fixed stabilizing surfaces, and by its cabin accommodations for the flying crew.

Contemplated by this invention are improvements directed particularly to the hull and engine section thereof in flying boats of the trans-oceanic type. The comfortable housing of the occupants of the boat; the arrangement of controls of the dual type; the employment of a wing structure which is erected on beams built directly into the boat hull and securely braced to the hydroplaning step thereof in a manner rendering this wing structure practically a component part of the hull; the novel and efficient support of a multiple-unit power plant by wing post frames; and the secure interbracing of the power plant units to each other and as a whole to the hull, via the mentioned built-in wing structure, are all important objects of my invention and are to be correlated in the broad aim of enhancing the efficiency of this craft for general use, and in particular for extended cruises.

The above, and additional objects which will be hereinafter more specifically treated, are attained by such means as are shown in the accompanying drawings, described in the following specification and then more clearly pointed out in the claims, which are appended hereto and form a part of this application.

With reference to the drawings, in which there is illustrated one embodiment of the invention, and throughout the several views of which like characters of reference designate similar parts.

Before taking up the detailed description of the drawings, a general exposition of the flying boat construction evolved by the present invention will be undertaken. The boat hull is essentially streamline, its uniform beam amidships tapering forwardly to a relatively blunt nose and rearwardly to the elongated tail upon which are supported the customary intersecting, horizontal and vertical stabilizing planes, together with the elevator and rudder controls. Projecting amidships is the cabin for occupation by the aviators, the sides and top of the cabin merging integrally into the streamline of the hull proper. A removable window-top terminates the cabin streamlines forwardly, protecting the aviators from the elements yet in no way obstructing their vision or hampering easy control.

The engine section of the boat provides for the exterior carriage of a number of power plant units, each motor unit being provided with a separate propeller and control, and being mounted in a framework which serves to connect the upper engine section panel with the lower, the latter being in the form of stub wings built directly into the hull structure. To these wing panels are hinged for lateral extension the supporting surfaces of the craft, the upper surfaces having terminal panels which extend beyond the lower surfaces and are equipped with ailerons of the trailing edge type. The multiple power plant has its units not only forming a part of the engine section in this manner but has them also braced to each other, while the panel as a whole is braced directly to the hull, and is arranged above the hydroplaning step of the latter in order to provide a substantially vertical alinement between the center of lift and the center of gravity.

As regards the rigid building of the mentioned wing panels into the hull, it is known to me that some efforts have been made previously to partially incorporate portions of the wing structure with that of the boat structure, but the construction to be hereinafter more fully explained progresses far beyond this point in so much as the wing beams are not only built into the side of the boat hull but are reliably associated with compression braces forming intimate components of the hull construction.

A most important addition in the built-in wing structure will be discovered in the bracing for each wing beam whereby the latter are securely connected to each extremity of the hydroplaning step of the boat, as well as being oppositely guarded by reaction braces, which complete a truss effect forming an arrangement of the greatest strength to serve as a base for the attachment of the aerial supporting surfaces.

Advantages of an obvious nature reside in the resultant security attained by the complete inter-relation of these hull and wing structures.

Beginning the more detailed description by reference to the hull of the flying boat, the numeral 10 indicates the keel upon which are erected floors 11 and over which is laid the outer planking 12 of the V-shaped hydroplaning bottom, a false keel 13 being alined exteriorly with the keel 10 at the vertex of the angled bottom portions. The planking 12 is extended laterally in a manner which is streamline in plan from the bow of the boat to the hydroplaning step 15 in order to provide the auxiliary planing fins 16, which in side elevation are also given curves partaking of a streamline nature. The V-shaped bottom of the boat rises gradually from the step to the bow, while the tail portion 17 has its flattened bottom making an angle of greater sharpness with the step, for well known reasons of efficiency.

Figure 2:
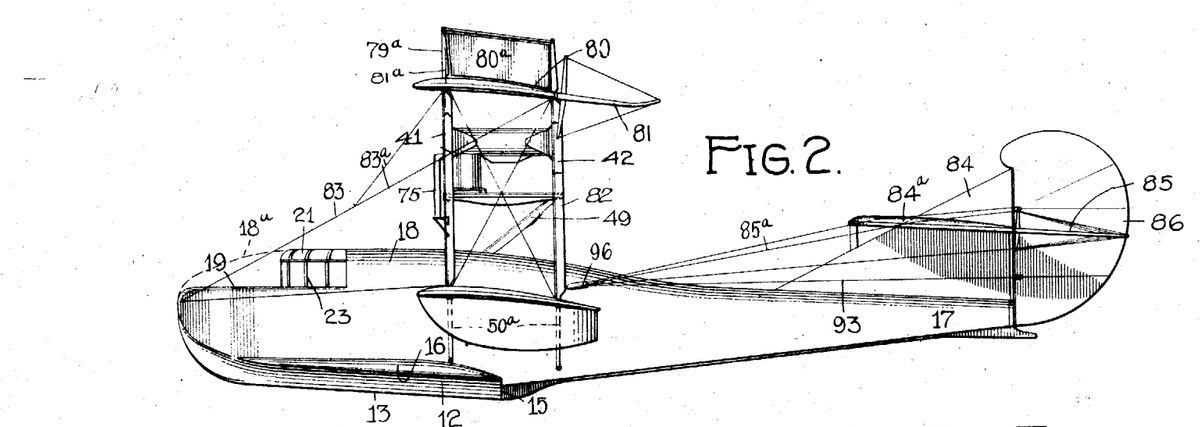
Fig. 2 is a view in side elevation of the complete boat.
Figure 3:
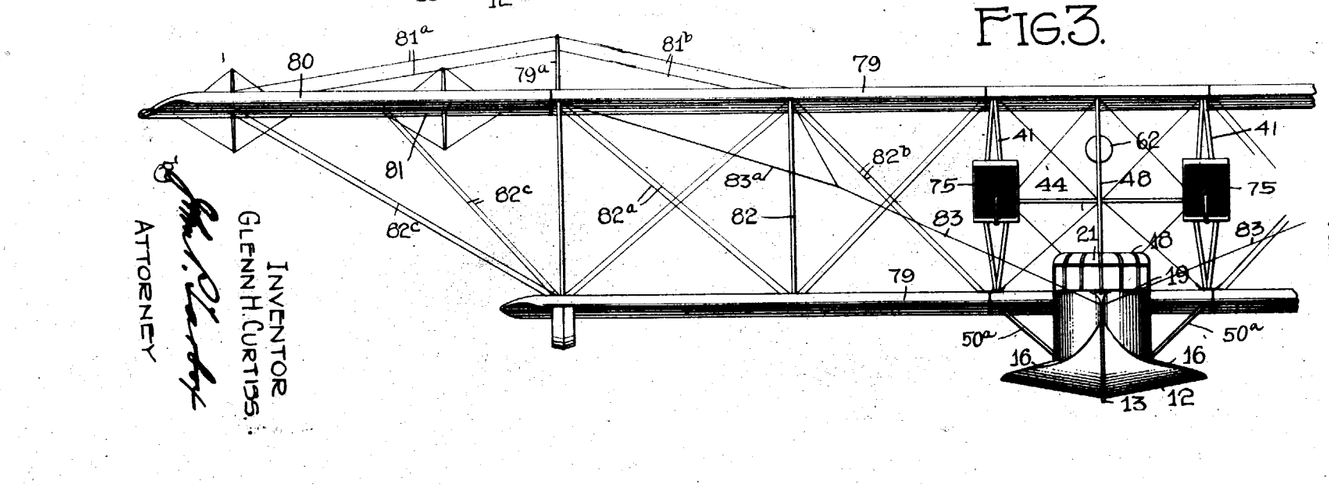
Fig. 3 is a partial front elevation of the boat.

The upper surface of the hull is enlarged forwardly from a point aft the vertical plane of the step, and the forward sweeping roof line of the cabin 18 thus provided may be continued to merge into the nose of the hull in the rounded manner denoted by the dotted line 18ª of Fig. 2. This roof curve is, however, destroyed or mutilated by the interposition of the short forward deck 19, the cabin front being abruptly cut down to vertically meet this deck line. Horizontally, the deck 19 is cut away to provide the half-circular control cockpit 20 at the front of the cabin and is edged by a combing 20ª for the mounting of a removable cover-top 21. This top is of semicylindrical formation to properly encompass the cock-pit and serves as a forward continuation and termination of the streamlines of the cabin 18.

Figure 4:
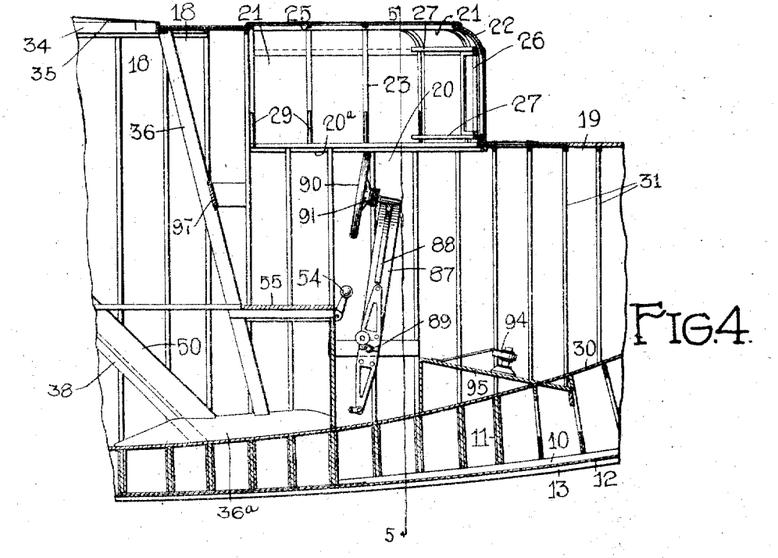
Fig. 4 is a partial, sectional view taken longitudinally through the boat and in particular through the cabin.
Figure 5:
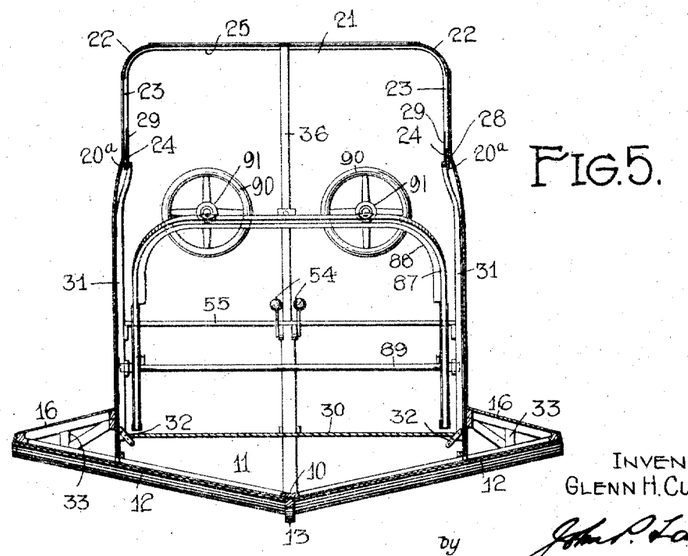
Fig. 5 is a transverse, sectional view taken on the plane indicated by the lines 5—5 of Fig. 4.

As at present constructed, the cabin top 21 is built upon the semi-circularly rounded cornice strip 22, which is also arcuate in cross section as is to be seen in Figs. 4 and 5. Spaced vertical strips 23 connect a combing band 24 to this cornice while the opposite sides of the cornice have fastened thereto the top strips 25 parallel to the diameter of its curvature and reinforced by a central strip 36. The spaces in between the cornice and the combing band, as defined by the vertical strips 23, and those spaces defined by the top strips 25 are covered with transparencies of some such suitable nature as celluloid or the like, except for the two foremost panels which are each adapted to be covered by a sliding door 26 which is movable, laterally and arcuately, between upper and lower guides 27. By this arrangement the aviator within the cock-pit has at all times a practically unobscured vision while at the same time being protected from the weather and being able to manipulate the sliding window 26 for the purpose of ventilation, when so desired. The method of mounting this cabin top upon the combing 20ª in order to provide for its ready removal, includes the placing of an exterior strip 28 adapted to overlie the combing upon which rests the lower edge of the band 24, in the manner well shown in Fig. 5. Plates 29 are carried by vertical ribs 23 to overlap the combing interiorly and to firmly secure the top in place.

Interiorly of the cabin, the flooring 30 is arranged upon the keel floors 11 while rib frames 31 define the cross sectional outlines of the hull and are connected to the said floors through the medium of the heel braces 32. The laterally extending fins 16 are provided with truss cross bracing 33 extending outwardly from the portion of the hull inclosed by such fins, and the superficial description of the hull construction may be concluded by mention of the entrance scuttle or hatchway 34 which is let into the cabin roof 18 immediately aft of the control cock-pit to permit entrance into the latter, and to admit light into the interior of the hull. A hatch-cover 35, of a flexible, curtain nature, preferably, is employed for protection of the hull interior in inclement weather and a forwardly and diagonally extending brace 36 lies in the central longitudinal plane of the boat to connect the roof 18 at the edge of this hatch to the hull bottom. This brace is received in a central footing 36ᵃ and has particular uses, aside from its ordinary strengthening function, which will be later disclosed.

The supporting surfaces of the flying boat are carried amidships of the hull in an extremely secure manner which contemplates a built-in arrangement for one of the wings and a very sturdy method of bracing and interconnecting the remainder of the wing structure thereto. Wing beams 37 and 38, respectively the leading and trailing beams of the lowermost wing panel, pass transversely and directly through the hull in the manner clearly illustrated in Figs. 6, 7, 8 and 9, some distance below the cabin roof 18 and slightly below the horizontal line of the forward decking 19 as rearwardly produced to this point. These beams are thus firmly embedded directly into the hull and are further secured by the diagonal compression braces 37ᵃ which converge from the respective beams to a secure anchorage upon the transverse hydroplane step 15. Reaction braces 38ᵃ extend from each beam in the direction opposite from the step. It is to be understood that a pair of the compression braces and of the reaction braces is arranged for each of the transversely projecting wing beams, one brace of each pair being located in each side of the hull as a component portion thereof, being secured to rib frames 31 which it intersects. In addition, upright standards 39 serve to vertically support the beam extremities, such uprights being arranged in the footings 39ᵃ and being incorporated into the opposite sides of the hull. From this sturdy arrangement, it will be apparent that a truss bracing structure for the wing beams has been achieved which is capable of forming the stub wings of the flying boat, and the hull thereof into a correlated whole.

The upper wing panel, through its leading and trailing beams 40 and 40ᵃ, is arranged for support and connection to the lower stub-wing, and by the forward and rear wing post frames 41 and 42 respectively, each wing frame including a pair of mating V-braces forming an elongated diamond. Sockets 43 are provided at the extremities of each of the V-braces of the wing post frames for connection to respective wing beams. These sockets have been illustrated in detail in Figs. 11 and 12 and will be described later more in detail, since they are important in serving as the anchorages for the cellular cross bracing 44 of the engine section.

Corresponding forward and rear frames 41 and 42 serve to mount between them the engine bed beams 45 for the motor units of the power plant, such beams being received at the junctures of the mating V-braces of each frame and being maintained in position through the medium of the overlapping clip plates 46. Transverse braces 47, whose seating sockets 47ᵃ will also be later more fully set forth, connect separate units of the multiple power plant to each other by way of center wing posts 48 which extend through the cabin roof to connect corresponding wing beams and serve to tie the whole wing and power plant structure into a unified whole. The entire engine structure is then braced directly to the hull through the medium of the forward and diagonally extending post brace 49 which connects the central point of the rear braces 47 with the corresponding point of the lower wing beam 37. A second post brace 50, alined in continuation of the main brace 49, extends in a similar forward oblique manner from the lower leading wing beam 37 for a secure anchorage in the boat hull in the footing 36ᵃ. Upon each pair of the wing beams is erected the panel covering, that of the lower wing projecting from the sides of the hull only, and the entire engine section thus formed serving as the attaching point for the demountable and laterally extending main supporting surfaces, the projecting wing panel being braced by diagonals 50ᵃ, directly to the hull sides.

In the foregoing there was dealt with only the construction employed for the support and arrangement of the power plant units. The operation and control of such units is now to be considered. Each of the engines to be carried on separate beds 45 in any desired manner that necessitates no particular illustration, is equipped with its separate means of adjustment for which purpose control wires 51 are trained over a pulley carried on the shaft extremity of the butterfly throttle valves for respective carbureters 52. These control wires are carried laterally into the boat through protective sleeves 53 along the forward lower wing beam 37, and are thence directed to separate control throttles denoted by the numerals 54 and mounted within the fore cabin of the craft and to the supporting structure for the pilot's seat 55, which extends transversely across this portion of the cabin and immediately below the conning top.

In the matter of gasolene supply to the engines it will be obvious that where the gravity feed system is to be employed, as in the present instance, that it would be most impracticable for a large reservoir to be arranged above the engines for this purpose since a tremendous head resistance would be offered thereby in addition to an undesirable raising of the center of gravity. Accordingly the system adopted for use in my invention includes the provision of a large tank reservoir to be mounted within the hull of the boat, where it cannot add to the head resistance thereof, and the provision of a small gravity tank for use in the operation of the motor units, this tank being automatically filled from the reservoir when the engines are running and necessitating manual filling only at the start.

The reservoir is denoted by the numeral 56 having a sump 57 formed in its bottom over which is mounted the strainer 58. A hand pump 59 adapted to propel liquid is placed near the pilot seat and serves as the junction for leads 60 and 61 connecting to the sump 57 and the gravity tank 62 respectively, the latter being mounted in an elevated position by some such desirable means as the straps 63 to the center posts 48 of the engine section. This tank is formed with a sediment trap or sink 64 along its bottom through which the lead 61 passes, as does the similar outlet lead 65 from the windmill pump designated by the numeral 66 and also connected with the reservoir sump by means of a duct 67. The windmill pump includes the usual pump chamber in which is operable the piston 68 driven from the fan axis 69 through the medium of ordinary crank and connecting-rod means. The shaft 69 carries volute fan blades 70 which are adapted to be actuated by the wind force created by the propellers when the machine is in flight.

Outlets for the gravity tank are present in the exit valves 71 leading from the sink 64 by different ducts 72 to opposite carbureters 52 whereby each of the motors is given its independent supply of motive fluid. Should either of the pumps operate to fill the tank to a higher level than desired, a return pipe 73 having its upper open mouth position at the predetermined level in the gravity tank, is provided to conduct the excess liquid directly back to the reservoir 56.

An oil tank 74 is positioned on each of the engine beds provided by the beams 45 connecting fore and aft wing post frames, for the ready service of the lubricating circuits, while the radiators 75 of separate water cooling systems are mounted upon forward shelves provided by the bracket arms 76 immediately in front of respective engine beds. An outlet 77 and inlets 78 extend between the radiators and the extremities of the circuit provided for the cooling liquid within each engine.

To the stub-wing panels erected on the upper and lower wing beams are attached main supporting surfaces 79 of the flying boat, the upper surface panels terminating in additional wing tip panels 80 which overhang the lower surfaces and are equipped with trailing edge ailerons 81. At the extremities of the main panels 79 are erected the masts 79ª to support anti-skid surfaces 80ª. From the upper extremities of these masts which are thus at the hinging edge of the main panels, there extend the supporting wires 81ª which are secured to the overhanging edge of the wing tip panel for the suspension thereof, reaction wires 81ᵇ bracing the masts back to the upper surfaces 79 with which they connect at points immediately above the wing posts 82 which join, in the usual manner the upper and lower supporting surfaces. These posts, one of which is also arranged under each of the masts 79ª, are cross-braced to each other by the usual tension wiring 82ª, that portion of such wiring denoted by the special numeral 82ᵇ being in direct continuation of the supporting members 81ᵇ and 81ª, so that the wing tip panels 80 are supported, via the masts, by suspension wiring tying such panels to the lower wing braces of the adjacent engine wing post frames. Counterbalancing and completing the suspension system are the connecting wires 82ᶜ which tie the panel 80 directly to the lower wing. Drift wires 83 extend rearwardly from the nose of the hull to respective yoke connections 83ª with forward and rearward wing posts 82, completing the draft system whereby the wing panels are most efficiently related to the hull.

Figures 1, 14:
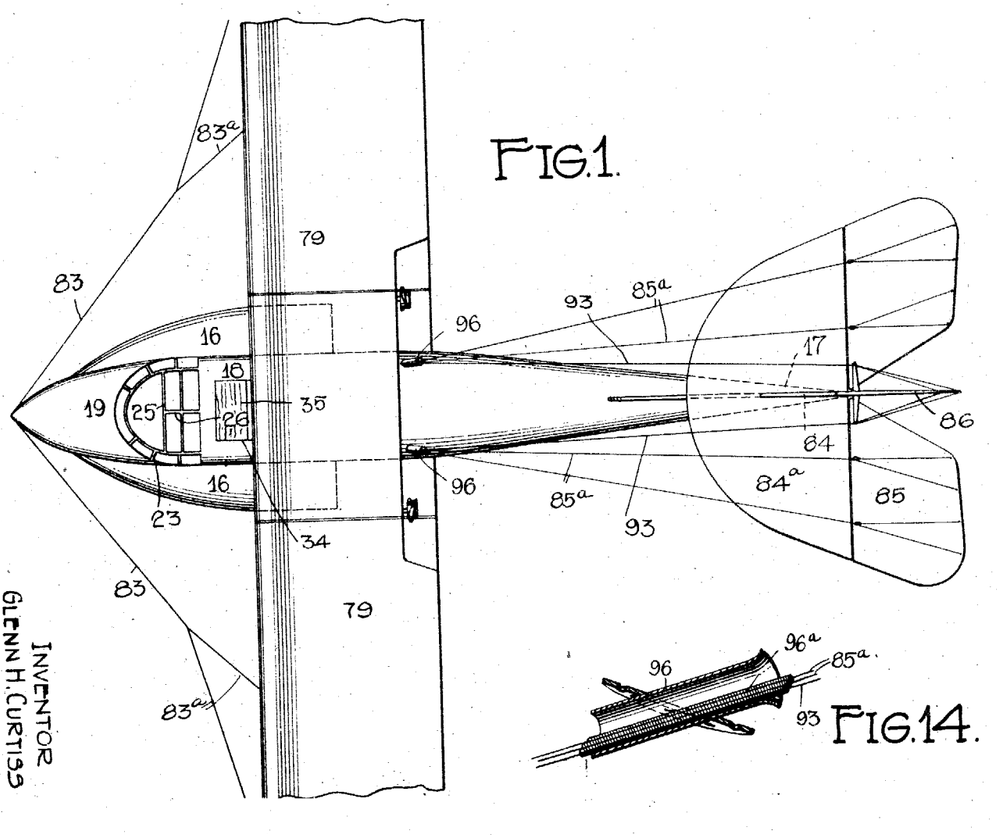
Figure 1 is a fragmentary plan view of the flying boat comprehended by my present invention.
Fig. 14 is a sectional view through one of the wire conduits.

Rearwardly the empennage supported upon the tail of the boat includes the customary vertical and horizontal fixed stabilizing surfaces 84 and 84ª to the latter of which are rearwardly hinged the elevator flaps 85 while to the former is hingedly connected the rudder 86. Control of these adjustable surfaces is arranged within the fore cabin of the boat hull and includes a substantially inverted U-yoke 87 which is intermediately braced by a rib 88 and has its extremities or arms commonly pivoted by the tube shaft 89. In suitable brackets there is mounted at opposite sides of the bight portion of this yoke 87 a pair of hand wheels 90 which form the dual control, since each of the hand wheels is equipped with a channeled winding reel 91, and the flexible cable commonly wound upon the reels is laid laterally across opposite wing panels and there connected to the respective trailing edge ailerons 80. Fore and aft oscillation of the U-shaped yoke upon its shaft 89 will operate the elevator flaps 85 through control cables 85ª for the purpose of giving them that positive or negative angle of incidence required to alter the up or down course of the machine. The rudder 86 may be operated through the medium of the cables 93 which are carried rearwardly from the oscillatable foot lever 94 mounted upon a small platform indicated at 95 to be immediately in advance of the pilot's seat 55. The control cables mentioned for the operation of the adjustable surfaces comprised in the empennage are usually plural and pass out from the hull through conduits 96 which are alined with the direction of pull upon the cables. Each of these conduits, as shown in Fig. 14, has arranged therein a plurality of fixed resilient wire guides 96$^a$, of a coil spring nature, through which the cables may easily pass with minimum wear.

Figure 10:
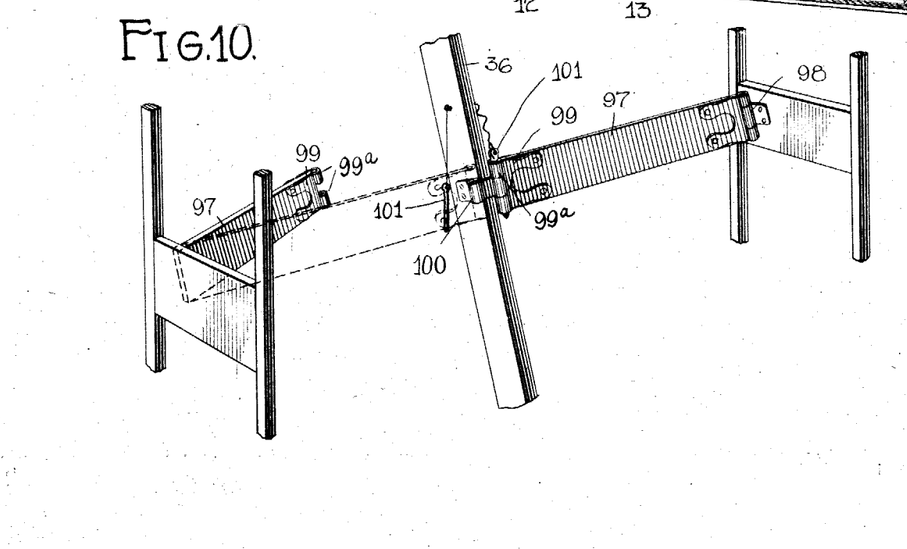
Fig. 10 is a detail perspective of the back for the aviators' seat.

It is now necessary to complete the description of several of the constructional details to which reference has already been made. Reference will first be had to Fig. 10 in which is illustrated the folding back for the aviators' seat, as arranged upon the roof brace 36. This back includes a pair of bars 97 which are obliquely hinged in the manner denoted by the numeral 98 to the opposite sides of the hull, and carry upon their inner ends the hinge fitting 99 which has ears 99$^a$ spaced to embrace the central ear or leaf 100 of the complementary fitting, such central ears being similarly formed upon a single strap which is carried by the mentioned brace 36 and projects into a proper alinement with the ears of the hinge fittings 99. Removable pins 101 are to be readily associated with the mating fitting portions when it is desired that the separate swing bars 97 form a back rest for the seat 55. At the time of entrance into the cockpit through the scuttle or hatch 34, these back rest bars 97 may be readily loosed by removal of the pins 101 in order to permit the aviators to clamber over the seat into the fore portion of the cockpit where the controls are located.

Figures 8, 11, 12, 13:
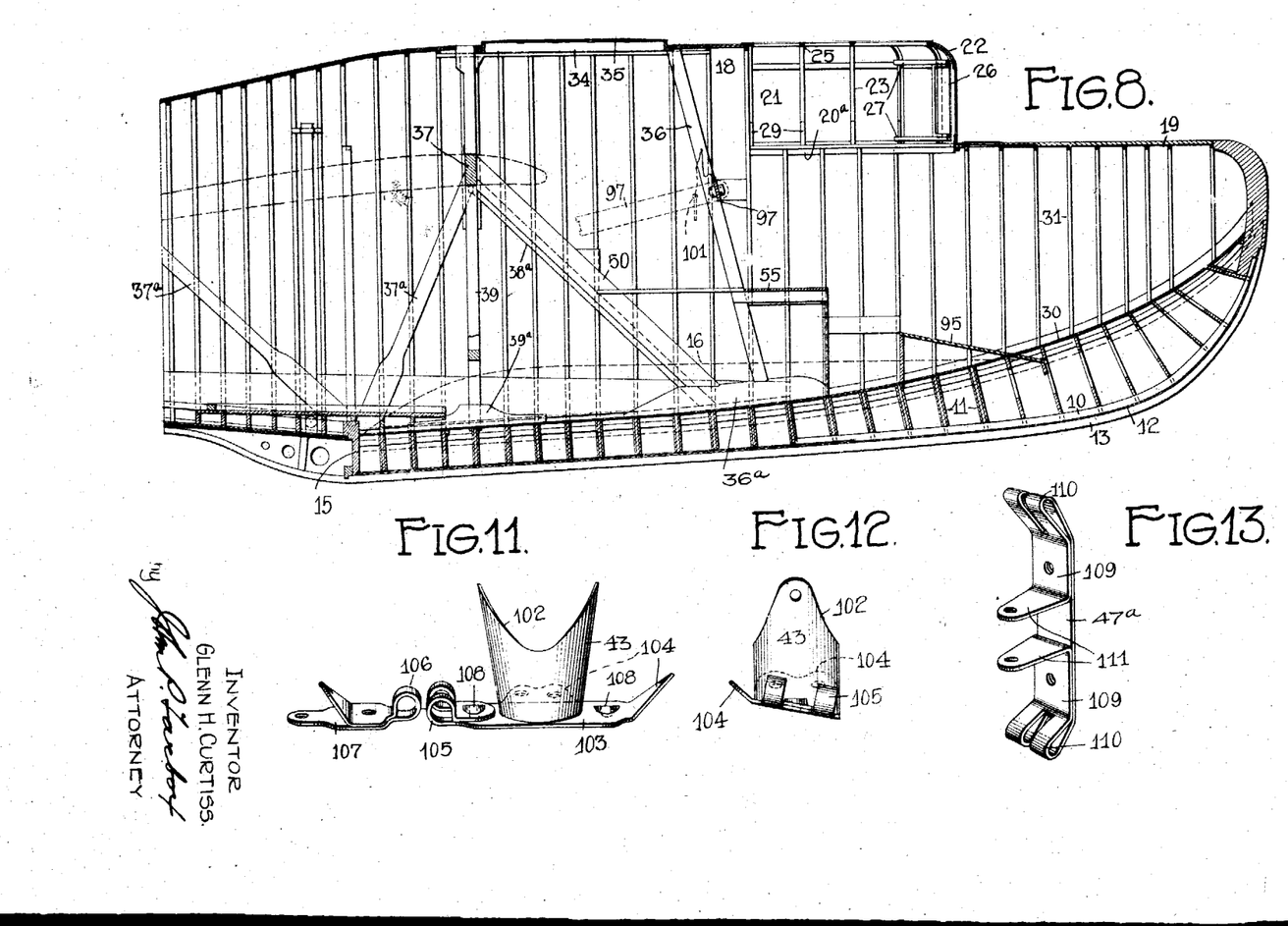
Figs. 8 and 9 show the fore and aft portions, respectively, of a longitudinal section through the hull.
Fig. 11 is an elevation of a hinge socket.
Fig. 12 is an end view of the same hinge connection.
Fig. 13 is a perspective view of a brace socket.
Figure 9:
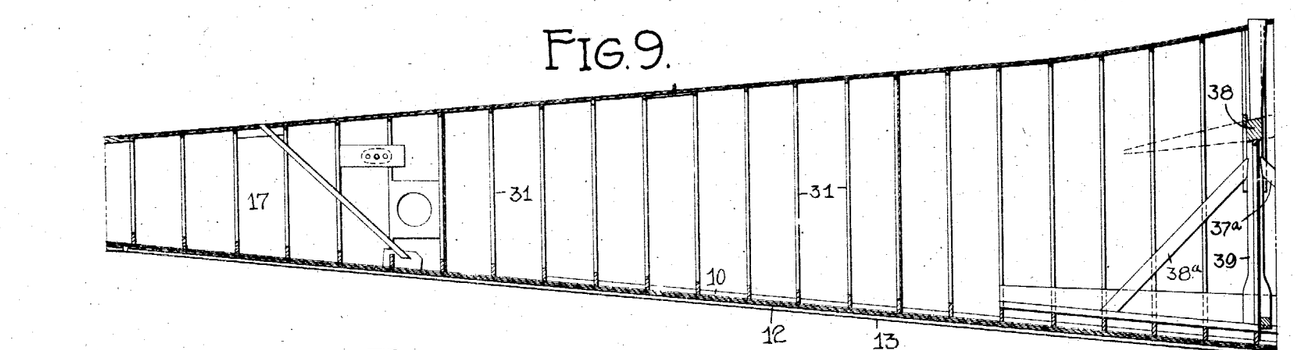

Directing attention now to Figs. 11, 12, and 13, a brief description of the socket fittings 43 and 47$^a$ will be undertaken. The former socket includes a post terminal gripping portion 102 which is mounted upon a base plate 103, the latter of which has apertured wire anchoring ears 104 projecting therefrom in two directions, while in a third direction the plate is elongated, slotted and lapped back upon itself to provide the spaced circular hinge ears 105. With these ears there mates a similar ear 106 formed as the bight portion of the wing fitting 107, the extremities of which fitting are diverged from each other to form anchoring ears for the cross wire bracing 82$^a$ extending between the wing posts. The wing fitting thus serves to receive the inner extremities of the truss braces 82$^a$ which would otherwise be connected directly to the wing post frame of the engine section panel, necessitating the disconnection of the truss bracing at these hinging points when the wings were dismounted from the hull, a serious disadvantage which is evaded by the novel construction of the present invention. Upon the base plate 103 of the socket 43 there are provided the raised bolt seats 108 which permit this plate to be firmly secured to its proper wing beam when connecting a wing post frame terminal thereto.

The socket 47$^a$ is so designed as to permit of its being formed of a single strip of material, the extremities 109 of which are each folded back upon the main body portion and intermediately provided with slotted bight portions 110 which serve as the anchorage for the cell wiring 44. The extremities are thus produced and flanged to form the opposite plates 111 of a socket adapted to firmly seat an extremity of the transverse braces 47 of the engine section.

Figure 6:
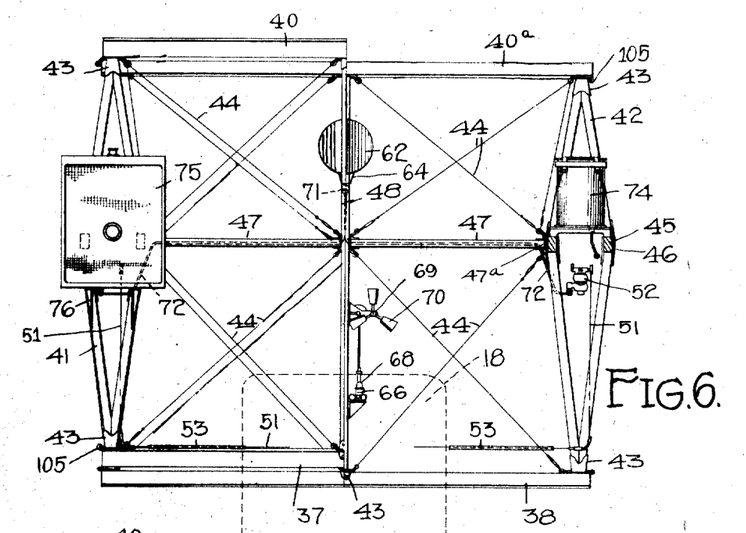
Fig. 6 illustrates the engine section of the boat in a half elevation-half section.
Figure 7:
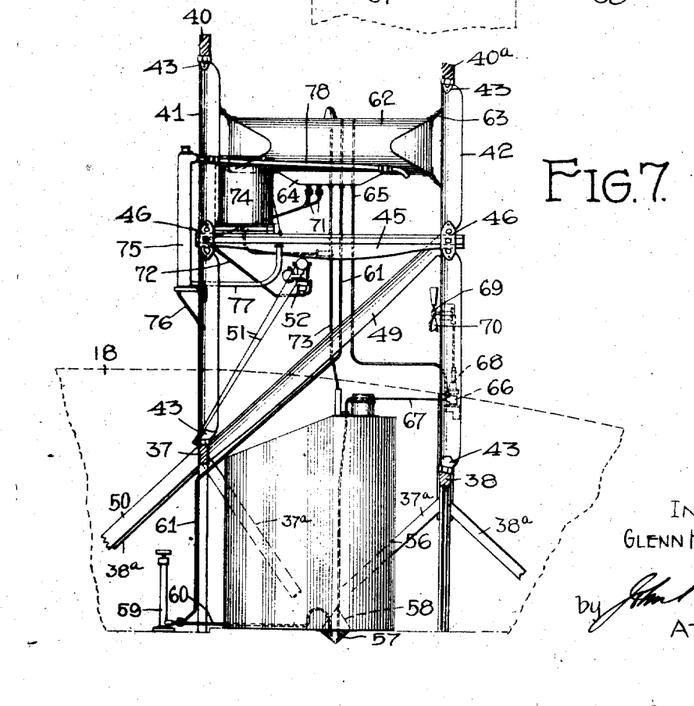
Fig. 7 is a longitudinal sectional view taken through the engine section.

It is by means of these transverse braces, in conjunction with the central wing beams 48 that the engine section defined by the upper and lower wing beams and their connecting frames are subdivided into intermediate cells, each of which is to be separately braced by means of the truss wiring 44, each wire running from one of the anchoring ears on a socket 43 to the loop ears 110 of the diagonally opposite socket 47$^a$, as is clearly apparent from an inspection of Fig. 6. Cellular interbracing of this character serves to tie the component parts of the engine section very firmly together.

While the foregoing description has been concerned with the detail construction whereby my present invention is to be preferably carried out, it is believed that a further discussion of the advantages afforded by my invention as so constructed, will be in place. In employing a multiple unit power plant in an invention of this character, it is most necessary that a draft system be organized which shall tend to the equal subdivision of work between the various motor units, and the transmission of tractive effort developed by the separate motors along symmetrical lines to the hull, where the motors are given such an arrangement with relation to the supporting surfaces and the boat hull as is here disclosed. It is requisite that the supporting surfaces and hull be associated with a degree of security far greater than would be required with the motor located in the hull. It is a second requisite that the motors be securely braced to the wing structure to form a unified engine section, and it is a third requisite that the engine section as a whole and inclusive of the stub-wing panels and the motors be firmly connected with the hull in accordance with a draft system forming a part of the engine section and continuing into the hull. Each of these requisites is so closely associated with its fellows as nearly to overlap in scope, but they may best be treated in distinct succession.

The first requisite is fulfilled by the employment of stub-wing panels, one of which is practically built directly into the hull structure and is braced thereto, in addition, by use of the post brace 50. In the second place the motor units and separate wing panels are combined to form a unified engine section by the employment of the wing post frames to serve as the sole supports for the separate engine beds and having the dual function of securely connecting the separate panels. In addition the panels are to be connected by the center posts of the engine section which pass through the hull roof. An absolutely complete unification may then be attained by the transverse connection of separate motor units by braces 47 having anchorage upon the mentioned center posts, and by the employment of the cellular interconnection just described. Lastly the necessity to brace the engine section thus unified to the hull is desirably accomplished by use of the oblique post brace 49 extending forwardly from the juncture of rear transverse braces 47 with the center post, and outwardly to the lower leading wing beam 37, from which the hull brace 50 extends in continuation. Symmetry, proper distribution of the forces to be dealt with and the acquisition of a great strength by a comparatively simple draft and bracing system are thus attained, owing solely to the method of connecting the supporting surfaces to the hull, of connecting the motor units and wing panels to form a unified engine section and the bracing of the engine section so unified directly to the hull.

While in the foregoing, however, there has thus been illustrated in the drawings and described in the specification such combination and arrangement of elements as constitute one preferred embodiment of this invention, it is desired to emphasize the fact that such departures from the particular embodiment disclosed may be made in later adaptations of this invention as shall be recognized as within the scope of the appended claims.

What is claimed is:

1. In a flying boat, a hull, lateral excrescencies formed thereon to augment the hydroplaning area thereof, and wing beams arranged to project transversely through the hull respectively fore and aft of the rearward termination of said excrescencies.

2. In a flying boat, a hull, wing beams projecting transversely through the hull, and means arranged interiorly of the hull to brace said beams and at the same time, when arising from and alighting upon the surface of the water, symmetrically distribute the resulting stresses uniformly throughout the hull.

3. In a flying boat, a hull, wing beams projecting transversely through the hull, and means interiorly bracing the beams to the chines of the hull.

4. In a flying boat, a hull, a hydroplaning step for the hull and wing beams projecting through the hull respectively fore and aft of said step.

5. In a flying boat, a hull, a planing step, wing beams built into said hull and means bracing said beams to said step.

6. In a flying boat, a hull, wing beams projecting transversely through the hull and means arranged in and forming a component part of the sides of the hull to brace said beams.

7. In a flying boat, a hull, wing beams projecting through said hull and means provided in the sides of said hull to brace each wing beam fore and aft thereof.

8. In a flying boat, a hull, wing beams extending transversely through the hull and means bracing the beams both toward and away from each other and in the planes of the sides of the hull.

9. In a flying boat, flooring, wing beams built transversely into said boat and meeting diagonals bracing said beams to said flooring.

10. In a flying boat, a planing step, wing beams built transversely into said hull and diagonals directly bracing said wing beams respectively forwardly and rearwardly to said step.

11. In a flying boat, a hull, a hydroplaning bottom, wing beams extending through the hull, and means bracing one of said beams obliquely into the hull and directly to said bottom.

12. In a flying boat, a hull, a beam projecting through the hull transversely, and means bracing the beam longitudinally to the hull at the center and sides thereof.

13. In a flying boat, a hull, beams projecting through the hull, means bracing each beam fore and aft of the hull in the planes of the sides thereof and means bracing said beams centrally longitudinally of the hull.

14. In a flying boat, a hull, wing beams projecting through the hull, means located within the hull to brace said beams thereto and means exteriorly connecting said beams to said hull.

15. In a flying boat, a hull, wing beams extending through the hull, rib frames determining the cross section outlines of the hull, means bracing said beams and located in the planes of the hull sides, and means securing said bracing means to said rib frames.

16. In a flying boat, a hull, wing beams extending across the hull, posts erected on said beams to project through the hull and a post brace also projecting through said hull to connect one of said posts with a wing beam.

17. In a flying boat, a V-shaped planing bottom, a step acting as a terminus for said bottom, a tail continuing from said step, wing beams extending across the hull, a brace from each beam to the step and braces from respective beams to said bottom and said tail.

18. In a flying boat, a hull, wing beams extending across the hull, posts erected on the beams and means bracing one of said beams from the foot of one of said posts into the hull.

19. In a flying boat, a hull, wing beams extending through the hull, posts erected on said beams and also extending through the hull, a brace connecting a post to a beam and a brace connecting the beam to the hull.

20. In a flying boat, a hull, wing beams extending across the hull, a post erected on each wing beam, a post brace extending from one of said posts to the opposite beam and means bracing said beam to the hull in alinement to said post brace.

21. In a flying boat, a hull, beams extending across the hull, a post erected on each wing beam, a post brace connecting one of the posts with the opposite beam and also extending through the hull, and a second brace alined with the first said brace to extend from said beam into the hull.

22. In a flying boat, a boat hull, a stub wing panel built into said hull for lateral extension considerably beyond the sides thereof, and separate engine supports erected on said panel respectively adjacent its terminals.

23. In a flying boat, a boat hull, a stub-wing panel built into said hull and separate supports erected on said panel for the engines of a multiple unit power plant for said boat.

24. In a flying boat, a boat hull, a stub-wing panel built into said hull and separate wing post frames erected on said panel to support a plurality of engines above said hull.

25. In a flying boat, a hull and diamond-shaped wing post frames erected above said hull to separately support the engines of a multiple unit power plant for said boat.

26. In a flying boat, a hull, a wing panel built into said hull, wing post frames erected on said panel and braces transversely connecting corresponding frames.

27. In a flying boat, a hull, a wing panel intersecting the hull and means bracing said panel to the hull both transversely and longitudinally.

28. In a flying boat, a boat hull, supporting surfaces, wing post frames erected on the surfaces including mating V-shaped braces, and beams interposed between the braces of corresponding frames.

29. In a flying boat, a hull, supporting surfaces, a diamond shaped frame connecting the surfaces and an engine bed supported by said frame in the plane of the transverse diagonal thereof.

30. In a flying boat, a hull, supporting surfaces for the hull, wing post frames erected on the surfaces, each frame including a pair of mating V-shaped braces and engine bed beams alined between each pair of corresponding frames at the juncture of the mating braces of each frame.

31. In a flying boat, a hull, a wing panel built into said hull, a second wing panel, wing post frames connecting the panels, each frame being formed of mating braces and truss wiring connecting each frame brace to the adjacent panel.

32. In a flying boat, a hull, supporting surfaces, wing post frames erected on the surfaces including mating diagonals, and beams interposed between the diagonals of corresponding frames.

33. A wing strut frame for aircraft comprising mating V-shaped braces and a connection between the mating braces in the plane of the transverse diagonals thereof.

34. In a flying boat, a hull, a wing structure built into the hull, a multiple unit power plant supported on said structure, means interbracing the power plant units, and means bracing the power plant as a whole to said hull via said wing structure.

35. In a flying boat, a hull, a wing panel built into the hull, a second panel, wing post frames connecting the panels for the support of the units of a multiple power plant with respect to the hull and posts centrally entering the hull to additionally connect said panels.

36. In a flying boat, a hull, a wing panel built into the hull, a second panel, wing post frames connecting the panels exteriorly of the hull, intermediate posts extending into the hull to connect said panels and lateral braces connecting each of said frames with an intermediate post.

37. The combination with a flying boat, having supporting surfaces and multiple unit propulsion, of a draft system including engine beds intermediate the supporting surfaces determining similar axes of thrust, thrust distributing means arranged between said engine beds and firmly connected to said boat, and means symmetrically harnessing each engine bed to the common thrust distributing means.

38. In a flying boat, a hull, wing beams extending through the hull, wing post frames erected on the extremities of said beams and wing posts centrally erected on said beams and projecting through said hull.

39. In a flying boat, a hull, wing beams extending across the hull, frames erected on each beam, braces connecting said frames transversely of the hull and engine bed beams connecting the frames longitudinally of the hull.

40. In a flying boat, a hull, wing beams extending across the hull, wing post frames erected on each beam, posts also erected on said beams, braces transversely connecting each frame with a post and engine bed beams longitudinally connecting said frames.

41. In a flying boat, a hull, a cabin, a footing arranged within said cabin, a wing structure built into the hull and braces forwardly extending respectively from the roof of said cabin to said footing and from said structure to said footing.

42. In a flying boat, engine section wing panels, frames connecting the panels, engine beds supported by the frames and means cellularly interbracing said engine beds.

43. In a flying boat, engine section panels, frames connecting said panels as engine bed supports, posts also connecting said panels, and braces transversely connecting corresponding frames and posts to cellularly subdivide the engine section.

44. In an aircraft, supporting surfaces, wing post frames erected on said surfaces including mating diagonals, and a socket common to the mating terminals of the respective wing post frames.

45. In an aircraft, supporting surfaces, wing post frames, beams interconnecting corresponding frames, and a tie means directly interconnecting adjacent beams.

46. In a flying boat, engine section panels, frames connecting the panels, wings in opposite lateral continuation of each panel, sockets for said frames, hinge mountings formed on a portion of the sockets for the connection of said wings to the panels and means also formed on each socket for the connection of an engine section brace thereto.

47. In a flying boat, a hull, engine beds arranged exteriorly of the hull and a lubricating tank carried at one end of each engine bed.

48. In a flying boat, engine beds, an engine and a lubricating tank carried upon each bed and a radiator arranged at the forward end of each of said beds.

49. In a flying boat, engine section posts and a streamline gravity feed fuel-tank flexibly swung from certain of said posts.

50. In a flying boat, a reservoir tank for motive fluid, a distributing tank connected to said reservoir tank, means mounting the first said tank in the hull of said boat, and means flexibly suspending the second said tank exteriorly of the hull.

51. In a flying boat, a hull, engines elevated thereabove, a motive fluid reservoir located in the hull, a gravity tank located above the engines, feed lines connecting said reservoir with the tank, means for manual fluid propulsion interposed on one of said feed lines and means for automatic fluid propulsion located on another of said lines.

52. In an aircraft, the combination with engine and a motive fuel reservoir located below the engines of a gravity tank positioned above the engines, feed lines connecting the reservoir and the tank, means for manually operating one of said feed lines when said engines are at rest and means for automatically operating another of said feed lines during the working period of said engines.

53. The combination with a vessel of flexible connections adapted to have a communication between the interior and exterior of said vessel, a conduit arranged to afford the passage for said connections and separate guides secured within said conduit to slidably encompass each connection.

54. The combination with a hull having control surfaces exteriorly carried thereby and an operating means for such surfaces interiorly located therein, a conduit alined between said surfaces and said operative means, flexible connections between said means and said surfaces and means of a resilient nature secured within the conduit to separately guide said flexible connections.

55. The combination with a vessel of flexible connections adapted to establish communication from the interior of the vessel outwardly therethrough, a conduit arranged to afford passage for the exiting connections and a resilient coil secured within said conduit for the separate guidance of each connection therethrough.

56. In a flying boat, a hull, a hydroplaning step, wing beams extending intermediately across the hull respectively fore and aft of said step, and separate supports erected on said beams for the engines of a multiple unit power plant.

57. In a flying boat, a hull, a panel comprising stub wings, a hydroplaning step formed in the hull bottom in the approximate vertical plane of the center of pressure, a multiple unit power plant located to bring its center of mass in the approximate vertical plane of the step, and supports for the power plant erected on the stub wings respectively.

58. In a flying boat, a hull, a stub wing panel built into the hull for lateral projection considerably beyond the sides thereof, diagonals bracing the terminals of the panel to the hull, and separate supports for the engines of a multiple unit power plant erected on said panel in the approximate vertical plane of the outer extremities of the diagonals.

59. In a flying boat, a hull, supporting surfaces, wing post frames erected on the supporting surfaces, a multiple unit power plant, engine beds interposed between corresponding frames, each bed extending at one end beyond the corresponding end of its associated power unit, and a tank mounted at the extended end of each engine bed.

60. In a flying boat, a hull, supporting surfaces including an engine section portion, a power unit arranged intermediate the surfaces constituting said engine section portion, and a means intermediate said surfaces diagonally bracing said power unit into the hull.

61. In an aircraft, supporting surfaces, engine bed beams, a power unit, and supports for said power unit including mating diagonals arranged for contact with respective beams.

62. In an aircraft, supporting surfaces, engine bed beams, V-shaped braces arranged to support the respective beams intermediate said surfaces, said braces being erected upon the lower surface, and a means continuing the V-braces to the upper surface, said means and said V-braces constituting collectively a wing post frame.

In testimony whereof I affix my signature.

GLENN H. CURTISS.